US011762648B2

(12) United States Patent
Ucar et al.

(10) Patent No.: US 11,762,648 B2
(45) Date of Patent: Sep. 19, 2023

(54) SYSTEMS AND METHODS OF COORDINATING APPLICATION VERSIONS AMONG CONNECTED VEHICLES

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Chang-Heng Wang, Mountain View, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 248 days.

(21) Appl. No.: 17/204,427

(22) Filed: Mar. 17, 2021

(65) Prior Publication Data
US 2022/0300267 A1    Sep. 22, 2022

(51) Int. Cl.
| | |
|---|---|
| *G06F 8/65* | (2018.01) |
| *G08G 1/16* | (2006.01) |
| *H04W 4/44* | (2018.01) |
| *B60W 30/18* | (2012.01) |
| *B60W 30/14* | (2006.01) |
| *B60W 50/06* | (2006.01) |
| *H04W 4/02* | (2018.01) |

(52) U.S. Cl.
CPC .............. *G06F 8/65* (2013.01); *B60W 30/14* (2013.01); *B60W 30/18163* (2013.01); *B60W 50/06* (2013.01); *G08G 1/162* (2013.01); *H04W 4/023* (2013.01); *H04W 4/44* (2018.02); *B60W 2556/65* (2020.02)

(58) Field of Classification Search
CPC .......................................................... G06F 8/65
See application file for complete search history.

(56) References Cited

U.S. PATENT DOCUMENTS

| | | | | |
|---|---|---|---|---|
| 7,698,698 | B2 | 4/2010 | Skan | |
| 9,464,905 | B2 | 10/2016 | Lewis | |
| 10,447,483 | B1* | 10/2019 | Su | H04L 9/0643 |
| 2006/0212194 | A1* | 9/2006 | Breed | G07C 5/008 |
| | | | | 701/1 |

(Continued)

FOREIGN PATENT DOCUMENTS

| | | |
|---|---|---|
| CN | 102567018 B | 9/2015 |
| CN | 107291511 A | 10/2017 |

(Continued)

*Primary Examiner* — Jae U Jeon
(74) *Attorney, Agent, or Firm* — Dinsmore & Shohl LLP

(57) ABSTRACT

A method may include determining whether a plurality of vehicles, each having an application installed are expected to be present within a predetermined distance of a location of an event. The method may further include comparing versions of the applications among the plurality of vehicles and, in response to determining that the plurality of vehicles are expected to be present within the predetermined distance of the location and determining that the versions of the applications among the plurality of vehicles are different, adjusting a version of the application installed in one or more of the plurality of vehicles.

20 Claims, 5 Drawing Sheets

(56) References Cited

U.S. PATENT DOCUMENTS

| | | | | |
|---|---|---|---|---|
| 2010/0169272 A1* | 7/2010 | Labatte | ................ | G06Q 10/06 |
| | | | | 707/674 |
| 2012/0233419 A1* | 9/2012 | Yamashita | ......... | G06F 11/1461 |
| | | | | 711/E12.103 |
| 2015/0161464 A1* | 6/2015 | Hansen | ................ | G06V 20/56 |
| | | | | 382/105 |
| 2015/0220321 A1* | 8/2015 | Jung | ..................... | H04L 67/12 |
| | | | | 717/169 |
| 2016/0029176 A1* | 1/2016 | Marti | .................... | H04W 4/18 |
| | | | | 455/456.3 |
| 2018/0362032 A1* | 12/2018 | Yang | ..................... | G08G 1/167 |
| 2020/0172112 A1* | 6/2020 | Kawashima | ......... | B60W 50/08 |
| 2021/0011709 A1* | 1/2021 | Itatsu | .................... | B60R 16/02 |
| 2021/0235285 A1* | 7/2021 | Guerena | ............. | H04W 16/28 |
| 2021/0404839 A1* | 12/2021 | Jiang | ................ | B60W 60/0025 |

FOREIGN PATENT DOCUMENTS

| | | | |
|---|---|---|---|
| CN | 109189427 | A | 1/2019 |
| CN | 109343875 | A | 2/2019 |
| CN | 111552648 | A | 8/2020 |
| EP | 1233636 | A2 | 8/2002 |
| WO | 2013167061 | A2 | 11/2013 |

\* cited by examiner

SYSTEMS AND METHODS OF COORDINATING APPLICATION VERSIONS AMONG CONNECTED VEHICLES

TECHNICAL FIELD

The present disclosure relates to an application management system, and more particularly, to systems and methods for coordinating application versions between vehicles.

BACKGROUND

Software applications are developed iteratively and result in multiple versions of applications. New versions of an application may be released to address problems in previous versions or introduce new features to the application, among other reasons. Regardless of the reasons that necessitate a new version of an application, new versions may sometimes become incompatible or less compatible with previous versions of the application. For instance, new features that become a key aspect of a newer version of an application may render the newer version incompatible with an older version because the new features may not have been built with backwards compatibility in mind.

The same issue is presented with the applications of connected vehicles. Connected vehicles may have applications that provide the vehicle with the capability to perform a set of functions. The connected aspect of connected vehicles allows vehicles to receive over-the-air updates to its applications so that the vehicle may receive patches and other changes to its system without the need for taking the vehicle to a servicer to update the vehicle. However, connected vehicles may receive new versions of the applications at different times, if at all, which may lead to a mismatch in application versions. This mismatch in application versions is especially problematic when the applications are used to coordinate maneuvers between vehicles. If the application versions are not properly compatible, the vehicles may not be able to interact with each other.

Accordingly, systems and methods for automatically matching application versions between vehicles are desired.

SUMMARY

According to one embodiment of the present disclosure, a method may include determining whether a plurality of vehicles, each having an application installed are expected to be present within a predetermined distance of a location of an event. The method may further include comparing versions of the application among the plurality of vehicles and, in response to determining that the plurality of vehicles are expected to be present within the predetermined distance of the location and determining that the versions of the application among the plurality of vehicles are different, adjusting a version of the application installed in one or more of the plurality of vehicles.

According to another embodiment of the present disclosure, a system may include one or more processors operable to determine whether a plurality of vehicles, each having an application installed, are expected to be present within a predetermined distance of a location of an event. The one or more processors may be further operable to compare versions of the application among the plurality of vehicles and, in response to determining that the plurality of vehicles are expected to be present within the predetermined distance of the location and determining that the versions of the application among the plurality of vehicles are different, adjust a version of the application installed in one or more of the plurality of vehicles.

According to another embodiment of the present disclosure, a non-transitory computer readable medium comprises machine-readable instructions that cause a processor to, at least, determine whether a plurality of vehicles, each having an application installed, are expected to be present within a predetermined distance of a location of an event. The machine-readable instructions further cause a processor to compare versions of the application among the plurality of vehicles and, in response to determining that the plurality of vehicles are expected to be present within the predetermined distance of the location and determining that the versions of the application among the plurality of vehicles are different, adjust a version of the application installed in one or more of the plurality of vehicles.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Connected vehicles may have applications that provide the vehicle with the capability to perform a set of functions. These software applications are developed iteratively and result in new versions of applications. These new versions of an application may be released to address problems in previous versions or introduce new features to the application, among other reasons. New versions of an application may sometimes become incompatible or less compatible with previous versions of the application. Additionally, connected vehicles may receive new versions of the applications at different times, if at all, which may lead to a mismatch in application versions. This mismatch in application versions is especially problematic when the applications are used to coordinate maneuvers between vehicles. If the application versions are not properly compatible with each other, the application may not function properly.

Embodiments of the present disclosure prepare vehicles to have consistent versions of an application installed before the vehicles reach a time and/or place that requires use of the application. Particularly, embodiments include determining whether a plurality of vehicles are expected to be present within a predetermined distance of a vehicle incident, and comparing versions of applications installed on the plurality of vehicles. In response to determining that the plurality of vehicles are expected to be present within the predetermined distance of the vehicle incident and that the versions of the applications among the plurality of vehicles are different, adjusting the applications installed in the one or more of the plurality of vehicles.

Intelligently adjusting versions of applications in a vehicle resolves the mismatched version problem. If a vehicle approaching an event has the most recent version of an application, other vehicles calculated to also be approaching the event may update the application to the most recent version. By contrast if a vehicle approaching an event has an older version of an application, other vehicles calculated to also be approaching the event may downgrade the application to the same older version to ensure compatibility and proper coordination between the vehicles. If, however, it cannot be determined whether a vehicle is approaching an event or it is not feasible to upgrade/downgrade on the fly, then other vehicles calculated to be approaching the event will replicate the application such that multiple versions of the application exist on any particular vehicle and may be changed, as the event requires. The system may utilize vehicle-to-vehicle (V2V), vehicle-to-everything (V2X), or other forms of communications to facilitate such on-the-fly updating/downgrading/replicating. Accordingly, disclosed herein are systems and methods of intelligent selection of application version.

Figure 1:
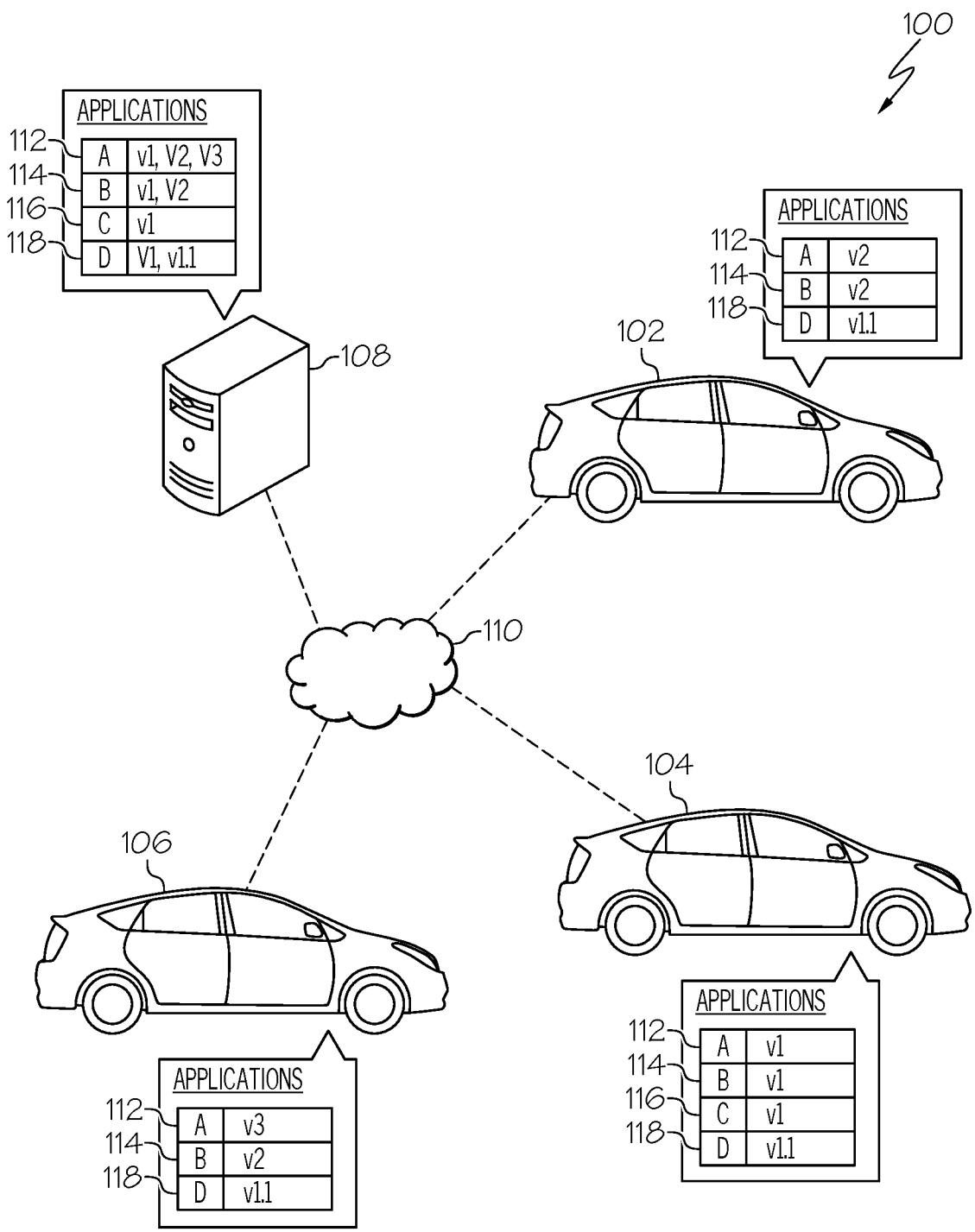
FIG. 1 depicts an example system for intelligent selection of application versions, according to one or more embodiments shown and described herein.

Referring now to FIG. 1, an example system for intelligent selection of application version is depicted. The system 100 may include connected vehicles 102, 104, 106, a server 108, a network 110, and applications 112, 114, 116, 118.

In some embodiments, the system 100 may utilize V2V communications to share versions of applications in a peer-to-peer fashion, in which case the server 108 may not be necessary. In other embodiments, the system 100 may utilize V2X communication, in which case the server 108 may be a central application repository. In other embodiments, the system 100 may utilize some combination of V2V, V2X, or other forms of communications, in which case the server 108 may assist in providing application versions.

The server 108 is a computing device that may be positioned remotely from any roads and/or vehicles. The server 108 may be a moving server, such as another vehicle, a cloud-based server, or any other type of computing device. As illustrated, the server 108 is a cloud-based server. The server 108 may be communicatively coupled to the connected vehicles 102, 104, 106 via wireless communication. In some embodiments, the server 108 may be a local server including, but not limited to, a roadside unit, an edge server, and the like.

Each of the connected vehicles 102, 104, 106 may be a vehicle including an automobile or any other passenger or non-passenger vehicle such as, for example, a terrestrial, aquatic, and/or airborne vehicle. In some embodiments, one or more of the connected vehicles 102, 104, 106 may be an unmanned aerial vehicle (UAV), commonly known as a drone.

Connected vehicles 102, 104, 106 are vehicles that contain one or more software applications and one or more radios to communicate with other vehicles and/or infrastructure. These software applications may include driving assist components (e.g., autonomous driving, CACC, etc.). Connected vehicles 102, 104, 106 may establish wireless connectivity with server 108 and/or with other connected vehicles 102, 104, 106. The vehicles may be unrelated to each other. That is, the owners and/or drivers of the vehicles need not know each other or plan ahead to initiate communication. Additionally, the system 100 allows intelligent version selection to be established at any time, even while vehicles are driving. Furthermore, three connected vehicles 102, 104, 106 are shown. However, it should be understood that any number of connected vehicles may be involved.

Connected vehicles 102, 104, 106 review the data related to their applications (e.g., purpose, features, resources, usage history) to infer where/when the applications may be triggered. Using the inferred application information, connected vehicles 102, 104, 106 also generate an application management strategy by analyzing trajectories and exploring the mobility pattern of other vehicles, comparing their applications to the applications of other connected vehicles they may encounter, exploring the cost of adjusting the application version, and adjusting the application version as necessary in advance of approaching the event.

For example, the server 108 may analyze the description accompanying application 112 using a natural language processing (NLP) model to extract an event where the application 112 may be utilized (e.g., vehicle incidents 402, non-signalized intersections 528 and 530, etc.). Server 108 determines that the application 112 is utilized at bridges. Server 108 also determines that the trajectories of the connected vehicles 102, 104, 106 are such that they will each be within one mile of the same bridge. The connected vehicles 102, 104, 106 share with the server 108 what version of the application 112 they each have. The server 108 knows that v1 served of the application 112 is 500 megabytes (MB), v2 of the application 112 is 50 MB, and v3 of the application 112 is 200 MB. The cost of upgrading and downgrading may be the file size of the application, for example. So, the cost to downgrade to v1 would be 500 MB for connected vehicles 102, 106 and the cost to upgrade to v3 would be 200 MB for connected vehicles 102, 104. Because the cost of adjusting the version of the application 112 is 0 MB for the connected vehicle 102, 50 MB for the connected vehicle 104, and 50 MB for the connected vehicle 106, the server 108 determines that each vehicle should have v2 of application 112 because lowering the amount of data that must be downloaded between the vehicles would reduce the time spent downloading. Connected vehicles 102, 104, 106 receive the determination from the server 108 and begin downloading v2 of application 112 from server 108 while in transit to the event.

Figure 2:
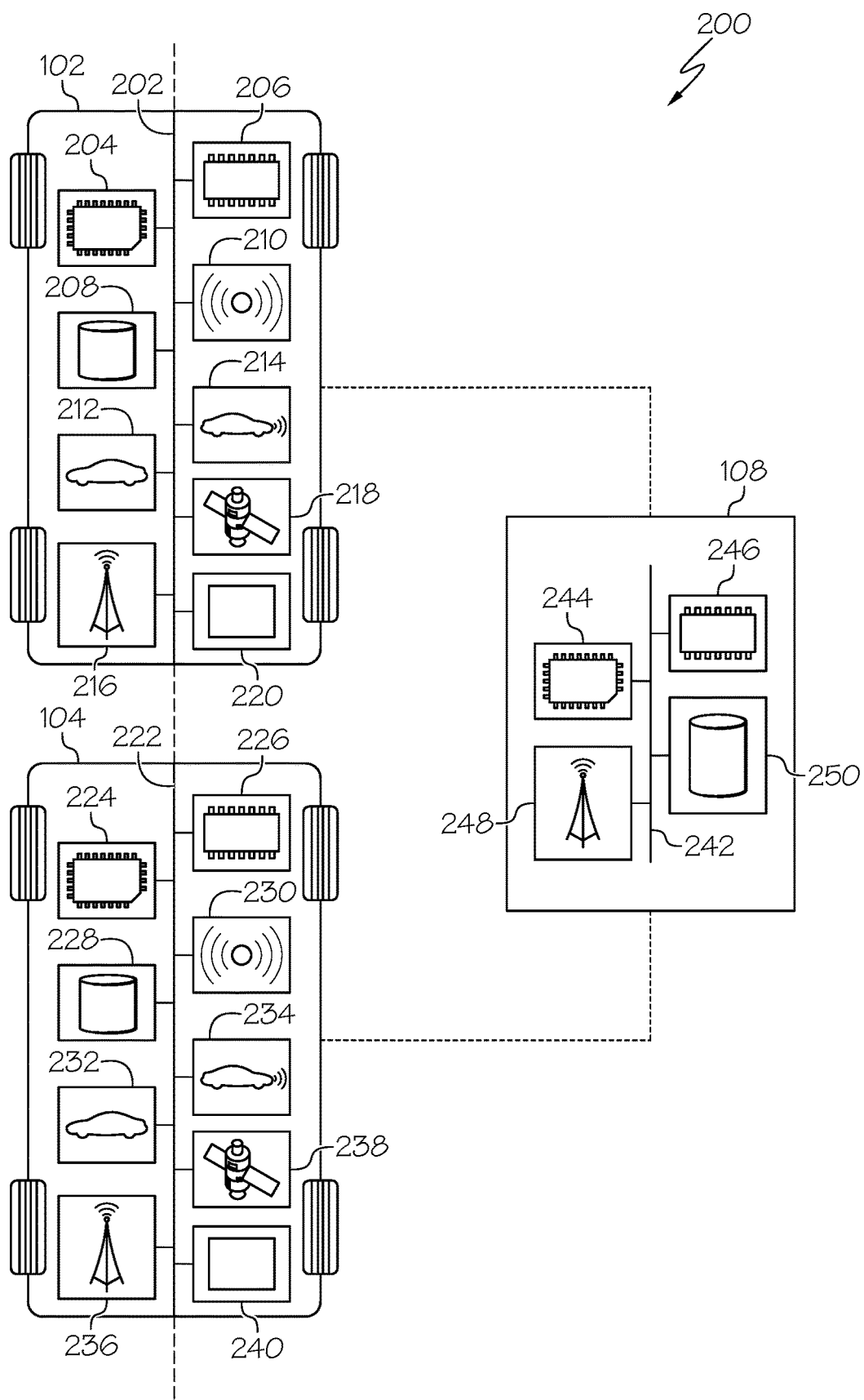
FIG. 2 depicts a schematic diagram of an example system, according to one or more embodiments shown and described herein.

Referring now to FIG. 2, a schematic diagram of an example system 200 is depicted. In particular, two connected vehicles 102 and a server 108 are depicted. The connected vehicle 102 may include a processor component 204, a memory component 206, a data storage component 208, a sensor component 210, a driving assist component 212, a vehicle connectivity component 214, a network connectivity component 216, a satellite component 218, and a user interface 220. The connected vehicle 102 also may include a communication path 202 that communicatively connects the various components of the connected vehicle 102.

The processor component 204 may include one or more processors that may be any device capable of executing machine-readable and executable instructions. Accordingly, each of the one or more processors of the processor component 204 may be a controller, an integrated circuit, a microchip, or any other computing device. The processor component 204 is coupled to the communication path 202 that provides signal connectivity between the various components of the connected vehicle. Accordingly, the communication path 202 may communicatively couple any number of processors of the processor component 204 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 202 may be formed from any medium that is capable of transmitting a signal such as, e.g., conductive wires, conductive traces, optical waveguides, and the like. In some embodiments, the communication path 202 may facilitate the transmission of wireless signals, such as Wi-Fi, Bluetooth®, Near-Field Communication (NFC), and the like. Moreover, the communication path 202 may be formed from a combination of mediums capable of transmitting signals. In one embodiment, the communication path 202 comprises a combination of conductive traces, conductive wires, connectors, and buses that cooperate to permit the transmission of electrical data signals to components such as processors, memories, sensors, input devices, output devices, and communication devices. Accordingly, the communication path 202 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory component 206 is coupled to the communication path 202 and may contain one or more memory modules comprising RAM, ROM, flash memories, hard drives, or any device capable of storing machine-readable and executable instructions such that the machine-readable and executable instructions can be accessed by the processor component 204. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory component 206. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The connected vehicle 102 also comprises the sensor component 210. The sensor component 210 is coupled to the communication path 202 and communicatively coupled to the processor component 204. The sensor component 210 may include, e.g., LiDAR sensors, RADAR sensors, optical sensors (e.g., cameras), laser sensors, proximity sensors, location sensor, and the like. In embodiments, the sensor component 210 may monitor the surroundings of the vehicle and may detect other vehicles and/or traffic infrastructure.

The connected vehicle 102 may also include a driving assist component 212, and the data gathered by the sensor component 210 may be used by the driving assist component 212 to assist the navigation of the vehicle. The data gathered by the sensor component 210 may also be used to perform various driving assistance including, but not limited to advanced driver-assistance systems (ADAS), adaptive cruise control (ACC), cooperative adaptive cruise control (CACC), lane change assistance, anti-lock braking systems (ABS), collision avoidance system, automotive head-up display, and the like. The information exchanged between vehicles may include information about a vehicle's speed, heading, acceleration, and other information related to a vehicle state.

The connected vehicle 102 also comprises a network connectivity component 216 that includes network connectivity hardware for communicatively coupling the connected vehicle 102 to the server 108. The network connectivity component 216 can be communicatively coupled to the communication path 202 and can be any device capable of transmitting and/or receiving data via a network or other communication mechanisms. Accordingly, the network connectivity component 216 can include a communication transceiver for sending and/or receiving any wired or wireless communication. For example, the network connectivity hardware of the network connectivity component 216 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices.

The connected vehicle 102 also comprises a vehicle connectivity component 214 that includes network connectivity hardware for communicatively coupling the connected vehicle 102 to other connected vehicles. The vehicle connectivity component 214 can be communicatively coupled to the communication path 202 and can be any device capable of transmitting and/or receiving data via a network or other communication mechanisms. Accordingly, the vehicle connectivity component 214 can include a communication transceiver for sending and/or receiving any wired or wireless communication. For example, the network connectivity hardware of the vehicle connectivity component 214 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices.

The connected vehicle 102 may connect with one or more other connected vehicles and/or external processing devices (e.g., the server 108) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

A satellite component 218 is coupled to the communication path 202 such that the communication path 202 communicatively couples the satellite component 218 to other modules of the connected vehicle 102. The satellite component 218 may comprise one or more antennas configured to receive signals from global positioning system (GPS) satellites. Specifically, in one embodiment, the satellite component 218 includes one or more conductive elements that interact with electromagnetic signals transmitted by GPS satellites. The received signal is transformed into a data signal indicative of the location (e.g., latitude and longitude) of the satellite component 218, and consequently, the connected vehicle 102.

The connected vehicle 102 may also include a data storage component 208 that may be included in the memory component 206. The data storage component 208 may store data used by various components and applications of the connected vehicle 102. In addition, the data storage component 208 may store data gathered by the sensor component 210, received from the server 108, and/or received from other vehicles. The data storage component 208 may be the installation location of its applications.

The connected vehicle 102 may also include an interface 220. The interface 220 may allow for data to be presented to a human driver and for data to be received from the driver. For example, the interface 220 may include a screen to display information to a driver, speakers to present audio information to the driver, and a touch screen that may be used by the driver to input information. In other examples, the connected vehicle 102 may include other types of interfaces 220. The interface 220 may output information that the connected vehicle 102 received from the server 108. For example, the interface 220 may display a notice that an application version has been changed.

In some embodiments, the connected vehicle 102 may be communicatively coupled to the server 108 by a network. The network may be a wide area network, a local area network, a personal area network, a cellular network, a satellite network, and the like.

The connected vehicle 104 may comprise the same or similar components as connected vehicle 102. The connected vehicle 104 may include a processor component 224, a memory component 226, a data storage component 228, a sensor component 230, a driving assist component 232, a vehicle connectivity component 234, a network connectivity component 236, a satellite component 238, a user interface component 240, and a communication path 222. The connected vehicle 104 may be communicatively connected to the server 108 by a network as well as to other connected vehicles, such as the connected vehicle 102. Multiple connected vehicles 102 and 104 can combine to form an ad hoc network with peer-to-peer information sharing abilities. This would obviate the use of a server 108 to externally manage autonomous path planning and thus keep calculations local and between the connected vehicles 102 and 104.

The server 108 comprises a processor component 244, a memory component 246, a network connectivity component 248, a data storage component 250, and a communication path 242. Each server component is similar in features to its connected vehicle counterpart, described in detail above.

Figure 3:
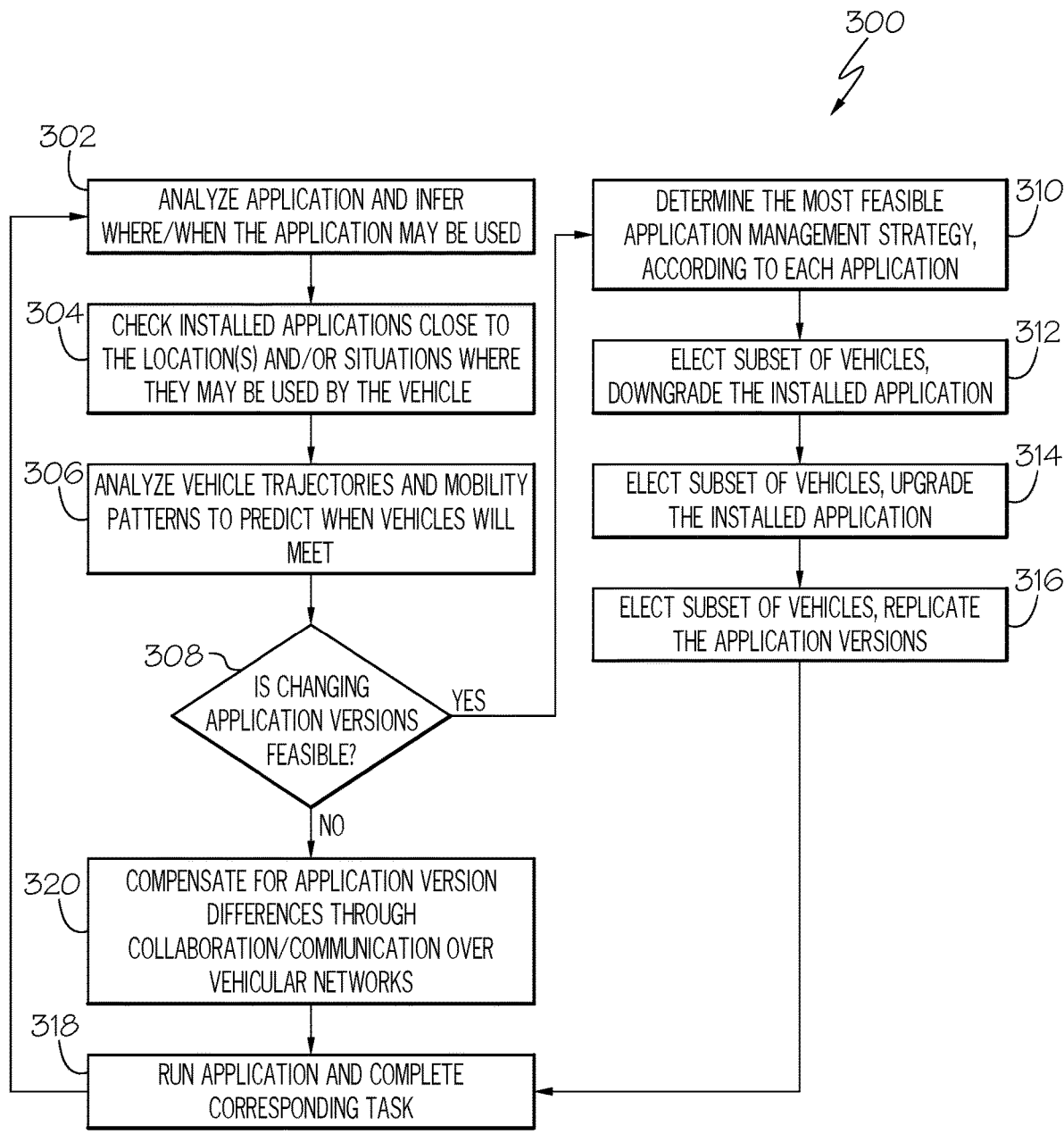
FIG. 3 depicts a flowchart of an example method, according to one or more embodiments shown and described herein.

Referring now to FIG. 3, a flowchart of an embodiment method 300 for intelligent version selection is depicted. The flowchart is described by referring to FIGS. 1 and 2, above. Embodiments of the method described herein are not limited to the steps included in FIG. 3 nor are they limited to the order as shown in FIG. 3.

At step 302, applications are analyzed to infer where/when the applications 112, 114, 116, 118 may be used. The applications 112, 114, 116, 118 may be stored in the data storage component 250 of the server 108 and/or in the data storage component 208 of the connected vehicles 102, 104, 106. The analysis may be performed by the processor component 244 of the server 108 and/or by the processor component 204 of the connected vehicles 102, 104, 106. The applications 112, 114, 116, 118 may have a description, usage history, and other associated data.

The server 108 and/or the connected vehicles 102, 104, 106 may use an NLP model trained to extract words associated with where/when an application may be used. For instance, an application may be entitled "Intersection Coordination Response Tool," and the NLP model may extract the word "intersection" as it relates to a specific type of traffic event. The server 108 and/or connected vehicles 102, 104, 106 may now associate intersections as the event where the "Intersection Coordination Response Tool" application may be used.

The server 108 and/or connected vehicles 102, 104, 106 may also analyze the usage history dataset of an application to determine where/when an application may be used. For instance, if an application is routinely used during the winter when a vehicle is crossing a bridge, the server 108 and/or connected vehicles 102, 104, 106 may now associate bridges as the event where the application may be used. The analysis of usage history may be performed by a pattern analysis machine learning model that is trained by prior usage of an application to forecast future usage of the application.

At step 304, connected vehicles 102, 104, 106 may check their installed applications when they are nearing the location(s) and/or situations (the "event") where the installed applications may be used. Checking installed applications may be based on a predetermined geographic distance from the event. For example, server 108 may have a threshold distance, which may change from time to time, of 1 mile, so that connected vehicles 102, 104, 106 within 1 mile of an event may begin checking their data storage component 208 for applications that may be used at the event. Vehicles may know where the event is located because they may receive the location of the event from other vehicles that identify the event and/or from a server that collects event information. Checking installed applications may also be based on a navigational route that encounters the event. For example, when a vehicle is calculating a route based on a destination entered into its navigation system, it may also determine the events it may encounter and check its data storage component 208 for applications that may be used at the events.

At step 306, server 108 and/or connected vehicles 102, 104, 106 may analyze vehicle trajectories and/or mobility patterns to predict what vehicles will meet at the identified events. Vehicle trajectories may include navigational routes, flow of traffic, and other indicators of driving paths. Mobility patterns may include driving history, aggressive driving, and other driving habits. These trajectories and patterns may be used to generate a list of events at which the connected vehicles 102, 104, 106 may converge. For example, server 108 may receive vehicle trajectory and/or mobility pattern data and a list of events generated at step 302 from each connected vehicle 102, 104, 106. The server 108 may determine that the navigation routes indicate that the connected vehicles 102, 104, 106 will converge within a 1-mile distance of a collision reported further along their route. In another example, the connected vehicle 102 identifies that it routinely encounters the connected vehicle 104 via V2V communication on its daily commute.

Once events have been identified at step 302, applications that may be used at the events have been identified at step 304, and other vehicles that may meet near the events have been identified at step 306, the method proceeds to step 308 where it determines whether changing application versions is feasible. Feasibility may be a function of numerous factors, including static and dynamic parameters. Static parameters include application size, hardware constraints, available space on the data storage component 208, etc. Dynamic parameters include driving behavior, traffic flow, network congestion, connectivity speed, signal strength, etc.

If it is feasible to adjust the versions of applications, then the method moves to step 310. Otherwise, the method moves to step 320.

At step 310, the server 108 and/or connected vehicles 102, 104, 106 may determine the most feasible application management strategy. For each application, the server 108 may compare the versions of the relevant applications installed on connected vehicles 102, 104, 106. The relevant applications are those that may be used at a previously identified event. The server 108 may maintain a list of connected vehicles and a list of applications installed in each connected vehicle. The versions of applications are compared by weighing static and dynamic parameters with regards to each version of each application to develop a version management strategy for each application. A version management strategy may be a decision to upgrade, downgrade, or maintain a version of an application or replicate other versions of an application on the vehicle.

For example, the server 108 has a list of applications 112, 114, 116, 118 and their versions. The server 108 has identified an event of a bridge that connected vehicles 102, 104, 106 may encounter. The server 108 has identified application B 114 as used at a bridge event. The server 108 knows that application B 114 has two versions: v1 and v2. The server 108 also knows that the connected vehicle 102 has version v2 of application B 114, the connected vehicle 104 has version v1 of application B 114, and the connected vehicle 106 has version v2 of application B 114, because the server 108 may maintain a list of application versions each connected vehicle has installed or because each connected vehicle reports what versions of each application they have. The server 108 may also determine that upgrading from v1 to v2 of application B 114 would require a 50 MB download, which would take 13 seconds given current network conditions, and downgrading from v2 to v1 of application B 114 would require a 100 MB download, which would take nearly 30 seconds given current network conditions. Because it would be faster and simpler to upgrade a single connected vehicle 104 to version v2 of application B 114 and maintain the current version of the remaining connected vehicles 102 and 106, the most feasible application management strategy would be to upgrade the application B 114 of the connected vehicle 104 to version v2 of application B 114.

Additionally, for each application 112, 114, 116, 118, connected vehicles 102, 104, 106 may compare between each other the installed versions of the relevant applications without the need for the server 108. The relevant applications are those that may be used at a previously identified event. The connected vehicles 102, 104, 106 may share what versions of applications they have via V2V, V2X, or some other form of communication.

Once the application management strategy has been determined, the server 108 may begin execution of the application management strategy. The server 108 may send a command to the appropriate connected vehicles to upgrade/downgrade their application version or replicate their application versions.

If the application management strategy determines that a vehicle's application does not need to be upgraded, downgraded, or replicated, then no command is needed from the server 108 or other connected vehicles 102, 104, 106.

At step 312, the server 108 sends a command to the appropriate connected vehicles to downgrade their application version. Alternatively, the connected vehicles 102, 104, 106 may determine that one or more of them must downgrade a version of an application. The lower version of the application may exist in the connected vehicle receiving the command, the server 108, and/or other connected vehicles. If the lower version of the application exists in the connected vehicle receiving the command, the connected vehicle may simply switch to that version. Otherwise, the lower version of the application is first downloaded from the server 108 and/or other connected vehicles and then the connected vehicle may switch to that version while retaining the higher version to potentially revert back to when the connected vehicle has passed the event.

For example, assume the connected vehicle 102 has version v2 of application A 112, the connected vehicle 104 has version v1 of application A 112, and the connected vehicle 106 has version v2 of application A 112, and that the application management strategy states that it would be more feasible to downgrade the applications of the connected vehicles 102 and 106 to version v1 of application A 112. The connected vehicles 102 and 106 may already have version v1 of application A 112 in their data storage component 208 from when they first installed version v1 of application A 112. If they do not, however, they may download version v1 of application A 112 from the server 108 via a V2X connection. If, for some reason, retrieving version v1 of application A 112 from the server 108 would be too slow, the connected vehicles 102 and 106 may download version v2 of application A 112 from the connected vehicle 104, who has version v1 of application A 112 currently installed, via a V2V connection. Version v1 of application A 112 may also be downloaded through a combination of the server 108 and the connected vehicle 104 in a peer-to-peer fashion.

At step 314, the server 108 sends a command to the appropriate connected vehicles to upgrade their application version. Alternatively, the connected vehicles 102, 104, 106 may determine that one or more of them must upgrade a version of an application. The higher version of the application may exist in the connected vehicle receiving the command, the server 108, and/or other connected vehicles. If the higher version of the application exists in the connected vehicle receiving the command, the connected vehicle may simply switch to that version. Otherwise, the higher version of the application is first downloaded from the server 108 and/or other connected vehicles and then the connected vehicle may switch to that version while retaining the lower version to potentially revert back to when the connected vehicle has passed the event.

For example, assume the connected vehicle 102 has version v2 of application A 112, the connected vehicle 104 has version v1 of application A 112, and the connected vehicle 106 has version v2 of application A 112, and that the application management strategy states that it would be more feasible to upgrade the application A 112 of the connected vehicle 104 to version v2 of application A 112. The connected vehicle 104 may already have version v2 of application A 112 in its data storage component 208 from a previous upgrade to version v2 of application A 112. If it does not, however, the connected vehicle 104 may download version v2 of application A 112 from the server 108 via a V2X connection. If, for some reason, retrieving version v2 of application A 112 from the server 108 would be too slow, the connected vehicle 104 may download it from the connected vehicles 102 and 106, who have version v2 of application A 112 currently installed, via a V2V connection. Version v2 of application A 112 may also be downloaded through a combination of the server 108 and the connected vehicle 104 in a peer-to-peer fashion.

At step 316, the server 108 sends a command to the appropriate connected vehicles to replicate their application to have a plurality of versions. Alternatively, the connected vehicles 102, 104, 106 may determine that one or more of them must replicate their application to have multiple versions. Pre-fetching multiple versions of an application in this way allows the vehicle to either upgrade, downgrade, or maintain application version as the event requires. The other versions of the application may exist in the connected vehicle receiving the command, the server 108, and/or other connected vehicles. If sufficient versions of the application exist in the connected vehicle receiving the command, the connected vehicle does not have to do anything. Otherwise, the other versions of the application are first downloaded from the server 108 and/or other connected vehicles and then the connected vehicle may switch to another version as the event requires.

For example, assume the connected vehicle 102 has version v2 of application A 112, the connected vehicle 104 has version v1 of application A 112, and the connected vehicle 106 has version v3 of application A 112, and that the application management strategy states that it could not determine feasibility of downgrading and upgrading. The connected vehicle 104 may already have version v2 of application A 112 in its data storage component 208 from a previous upgrade to version v2 of application A 112. If the connected vehicle 104 does not have version v2 of application A 112, however, the connected vehicle 104 may download version v2 of application A 112 from the server 108 via a V2X connection. If, for some reason, retrieving version v2 of application A 112 from the server 108 would be too slow, the connected vehicle 104 may download it from the connected vehicle 102, who has version v2 of application A 112 currently installed, via a V2V connection. Version v2 of application A 112 may also be downloaded through a combination of the server 108 and the connected vehicle 104 in a peer-to-peer fashion. The connected vehicle 104 may also download version v3 of application A 112 through the server 108, the connected vehicle 106, or combinations thereof to have all three versions of application A 112 replicated on its data storage component 228 so that it may switch to any version of application A 112 as the situation requires.

At step 318, each connected vehicle 102, 104, 106 should have a consensus on which application version to use for optimal compatibility at the event for which the application is used. Each connected vehicle 102, 104, 106 may have the same version of the application installed within a predetermined distance of a location of the event. Downloading, as distinct from the installation, may occur any time before installation, to allow for a pre-fetching of a higher, lower, or replicated version of an application for later installation. After the connected vehicle has passed the event benefitting from use of the consensus version of the application, the connected vehicle may maintain that version, or revert back to the previous version of the application. The connected vehicle may also retain the downloads of the higher, lower, or replicated versions of an application for subsequent executions of the embodiment method 300.

If, at step 308, it is not feasible to adjust the versions of applications (e.g., the application would take too long to download and/or install), then the method moves to step 320.

At step 320, the system must compensate for the differences in application version through communication over vehicular networks. Connected vehicles with a different application version at an event may attempt to communicate with the other vehicles (e.g., via its vehicle connectivity component 214 for V2V communication) since it may not be able to fully coordinate its maneuvers as it would with the appropriate application version. Connected vehicles with a different application version may also rely more heavily on data from its sensor component 210 so it can determine and anticipate the maneuvers of the other connected vehicles at the event since it cannot coordinate its maneuvers with the other connected vehicles. Connected vehicles with a different application version may still run the application it has installed at step 318, but it might not be as effective as having a matching application version with the other connected vehicles because it may not have matching features, protocols, standards, etc. that a newer version of an application may have.

Figure 4:
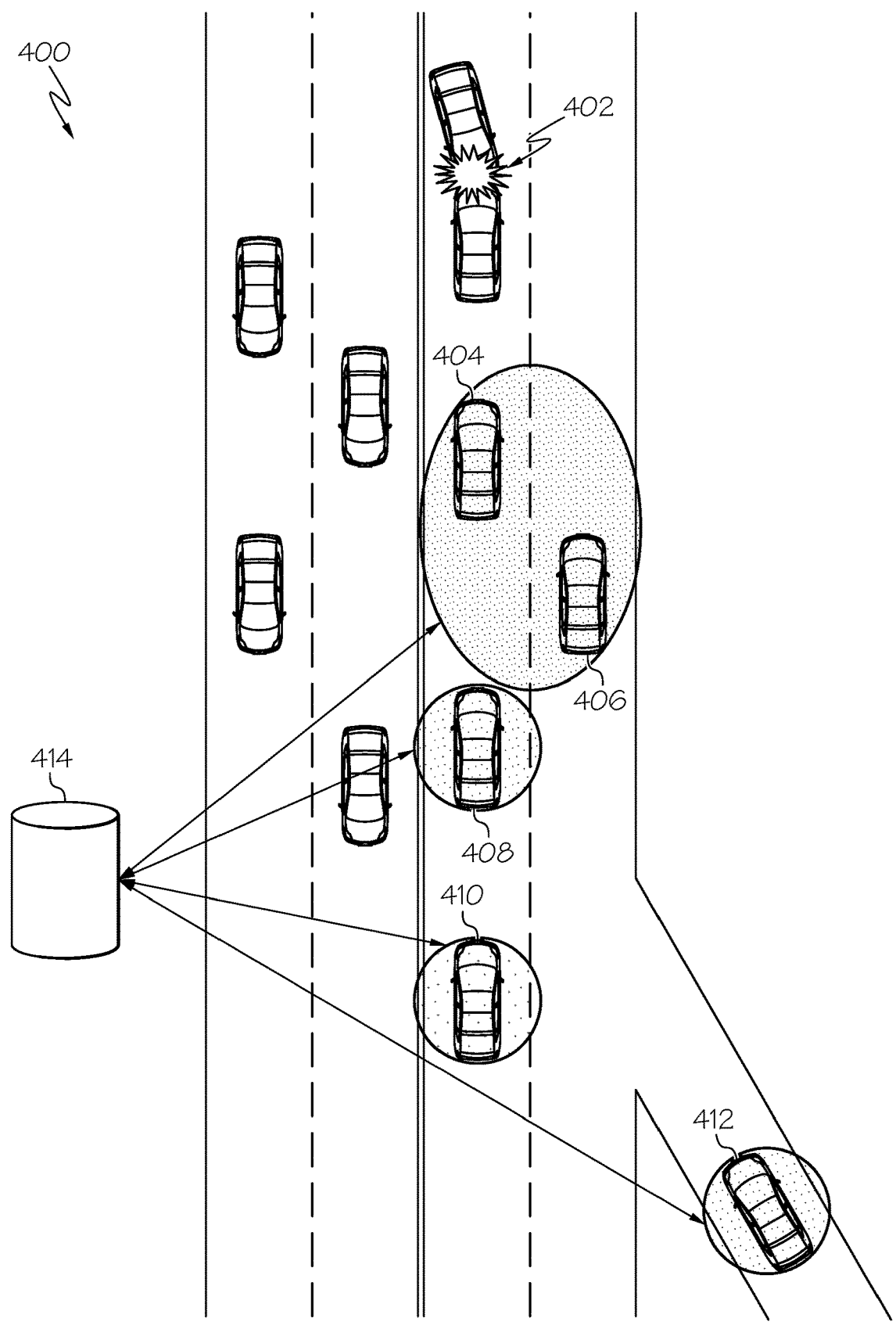
FIG. 4 depicts a plurality of connected vehicles approaching a scenario that may require a lane change assistance application, according to one or more embodiments shown and described herein.

Referring now to FIG. 4, a lane change scenario 400 is depicted. Connected vehicles 404, 406, 408, 410, 412 may have a lane change assistance application to help connected vehicles 404, 406, 408, 410, 412 pass a vehicle incident 402 efficiently. The lane change assistance application is triggered when a vehicle incident 402 is detected. A vehicle incident 402 may be collisions, construction, stopped vehicles, or any other condition that impairs the ordinary flow of traffic. The application may help connected vehicles 404, 406, 408, 410, 412 coordinate lane changes between each other to reduce traffic congestion from lane closures, rubbernecking, etc.

A server 414 analyzes its list of applications to infer where/when each application may be used. The server 414 may correspond to the server 108 in FIGS. 1 and 2. When the server 414 reaches the lane change assistance application in its analysis, it infers that the application may be used at construction zones, collisions, etc. based on the past usage of the lane change assistance application. The inferred scenarios are scenarios that may include the vehicle incident 402. These inferences may stay at the server 414 or may be distributed to connected vehicles 404, 406, 408, 410, 412 to help them determine for which scenarios each application may be useful.

The server 414 may receive a notice from infrastructure, passing vehicles, public databases, etc. that a vehicle incident 402 has taken place. The server 414 may check the installed applications of connected vehicles 404, 406, 408, 410, 412 for relevant applications when they come within a predetermined distance or are anticipated to come within a predetermined distance of the vehicle incident 402. For example, the GPS route set by the connected vehicle 412 routes the connected vehicle 412 within a 1-mile threshold distance of the vehicle incident 402. In response, the server 414 begins checking the installed applications of the connected vehicle 412 for applications relevant to the vehicle incident 402. One application relevant to the vehicle incident 402 for the connected vehicle 412 is a lane change assistance application.

The server 414 also determines that the connected vehicles 404, 406, 408, 410 are anticipated to come within a predetermined distance of the vehicle incident 402 based on their trajectory where they will encounter the vehicle incident 402 if they continue down the road. The server 414 also checks their installed applications and determines that the connected vehicle 410 is on version 1 of the lane change application, the connected vehicles 408 and 412 are on version 2 of the lane change application, and the connected vehicles 404 and 406 are on version 3 of the lane change application.

The server 414 then proceeds to determine whether it is feasible to adjust application versions of the lane change application in each connected vehicle 404, 406, 408, 410, 412 approaching the vehicle incident 402. Static parameters indicate that each version of the application has a small file size and that vehicle hardware conditions are optimal (e.g., there is enough storage space). Dynamic parameters indicate that the connected vehicles 408, 410, 412 are behaving predictably, the networks are performing ideally (e.g., not overly congested), and the connected vehicles 408, 410, 412 have a strong connection with the server 414.

Because the server 414 determined that it is feasible for the connected vehicles 408, 410, 412 to adjust their version of the lane change application, the server 414 then determines the most feasible application management strategy. That is, the application management strategy that is most likely to be successful. The server 414 may determine that the most feasible application management strategy would be to have the connected vehicles 404 and 406 maintain their current versions of the lane change application, while having the remaining connected vehicles 408, 410, 412 upgrade their versions of the lane change application to match the versions of the lane change applications of the connected vehicles 404, 406. The server 414 may determine that it would be most feasible to not adjust the version of the lane change application in the connected vehicles 404 and 406 because they are so close to the vehicle incident 402 and may not be able to adjust soon enough, especially if they have to download another version. However, the server 414 may determine that it is most feasible for the remaining connected vehicles 408, 410, 412 to upgrade their versions to match the version of the connected vehicles 404, 406 because they are further away from the vehicle incident 402 and perhaps because the download size of the upgraded versions is so small.

The server 414 executes the most feasible application management strategy by first sending a downgrade command to a subset of connected vehicles. Here, there are no connected vehicles to downgrade.

The server 414 then sends an upgrade command to a subset of connected vehicles. Here, the connected vehicles 408, 410, 412 will upgrade. Connected vehicle 410 will upgrade two versions and the connected vehicles 408, 410, 412 will upgrade one version. The connected vehicles 408, 410, 412 downloads the necessary versions from the server 414 and installs them. Previous versions may stay on the connected vehicle for use after they have passed the vehicle incident 402, if space in the storage component 208 permits.

The server 414 may also send a replicate command to a subset of connected vehicles. Here, the server 414 has determined that the most feasible management strategy can arrange each vehicle to be on the same version of the lane change application with a fair degree of certainty. If the server 414 was less certain about its management strategy or some of the connected vehicles of the current management strategy overlap with the connected vehicles of an upcoming management strategy, the server 414 may command some connected vehicles to replicate the lane change application by downloading multiple versions of the lane change application so that the vehicles may be able to adjust to different versions more quickly.

After the connected vehicles 408, 410, 412 have received the upgrade command from the server 414 and downloaded and installed the upgraded version of the application, each connected vehicle 404, 406, 408, 410, 412 should have a consensus on which application version to use for optimal compatibility at the vehicle incident 402. The connected vehicles 408, 410, 412 may now arrange for the most optimal lane changes as the lane change applications are now matching to enable them to properly communicate with each other and prevent errors that may arise from mismatched versions of the lane change application.

Figure 5:
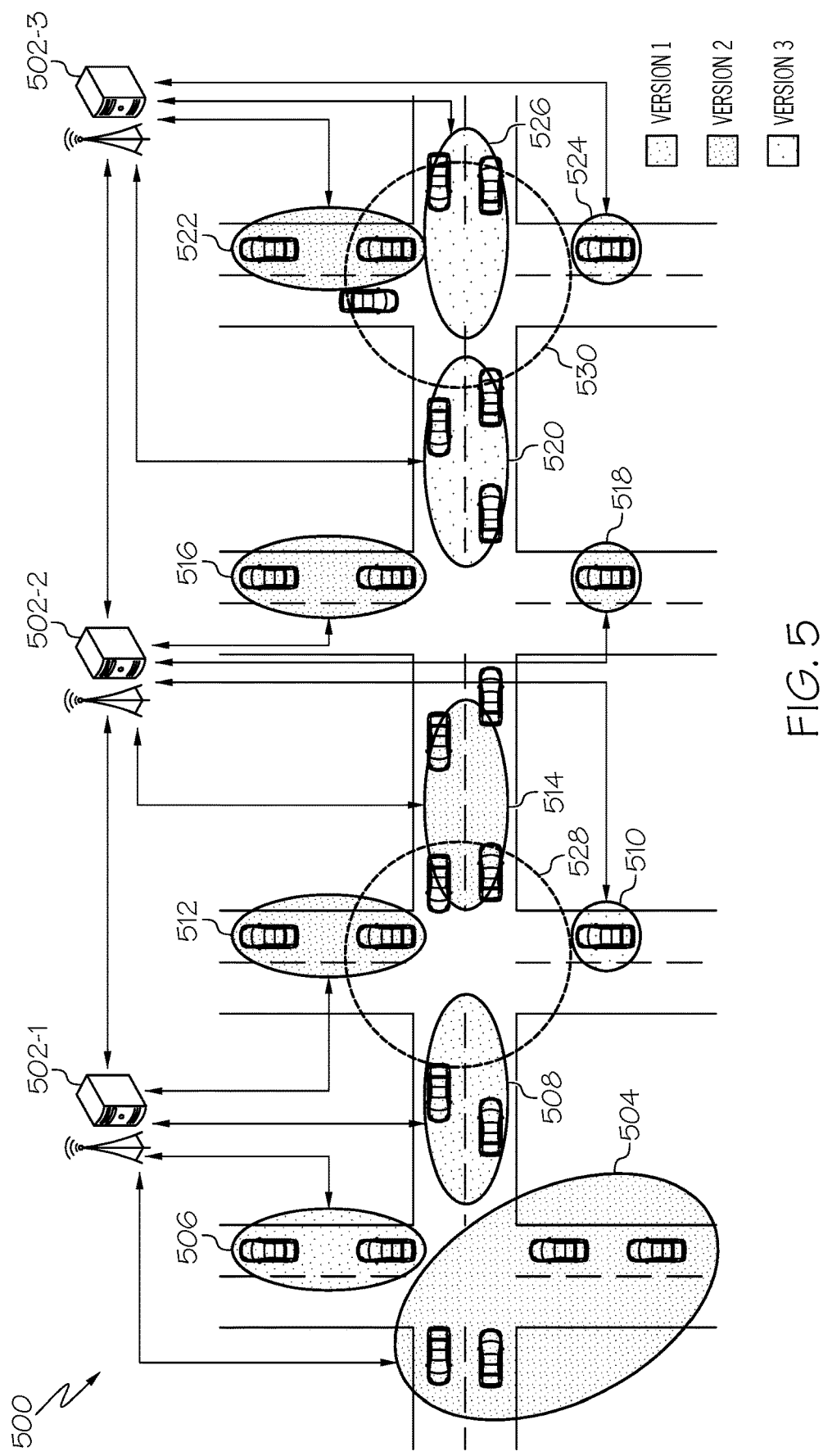
FIG. 5 depicts a plurality of connected vehicles approaching a scenario that may require a stop management application, according to one or more embodiments shown and described herein.

Referring now to FIG. 5, a 4-way stop scenario 500 is depicted. Connected vehicles 504, 506, 508, 510, 512, 514, 516, 518, 520, 522, 524, 526 may have a 4-way stop management application to help the connected vehicles 504, 506, 508, 510, 512, 514, 516, 518, 520, 522, 524, 526 pass through 4-way non-signalized intersections 528 and 530 efficiently. The stop management application is triggered when 4-way non-signalized intersections 528 and 530 are detected.

The servers 502-1, 502-2, 502-3 communicate with each other and share information about vehicles that they receive from the vehicles. For example, the server 502-1 communicates with the connected vehicles 504, 506, 508, 512, the server 502-2 communicates with 510, 514, 516, 518, and the server 502-3 communicates with the connected vehicles 520, 522, 524, 526. Each of servers 502-1, 502-2, 502-3 analyzes its list of applications to infer where/when each application may be used. When the servers 502-1, 502-2, 502-3 reach the 4-way stop management application in its analysis, it extracts the term "4-way stop" with an NLP model and infers that the application may be used at 4-way intersections. The servers 502-1, 502-2, 502-3 also review the application's usage history to further infer that the application is particularly used at 4-way non-signalized intersections 528 and 530.

The connected vehicles 504, 506, 508, 510, 512, 514, 516, 518, 520, 522, 524, 526 may check their installed applications when they are nearing the location(s) and/or situations where their applications may be used. The connected vehicles 504, 506, 508, 510, 512, 514, 516, 518, 520, 522, 524, 526 detect 4-way non-signalized intersections 528 on their routes based on an analysis of navigational routes, flow of traffic, commutes, etc. Checking installed applications may be based on a predetermined distance from the event. Because 4-way non-signalized intersections 528 and 530 may be common in scenario 500, the connected vehicles 504, 506, 508, 510, 512, 514, 516, 518, 520, 522, 524, 526 may have a smaller distance from the intersections 528 and 530 for which they begin checking their installed applications. Here, connected vehicles 506, 508, and 524 have version 1 of the intersection application installed; connected vehicles 504, 512, 514, 516, 518, and 522 have version 2 of the intersection application installed; and connected vehicles 510, 520, and 526 have version 3 of the intersection application installed. After checking their installed applications when they approach the intersections 528 and 530, the connected vehicles 504, 506, 508, 510, 512, 514, 516, 518, 520, 522, 524, 526 may report this information to servers 502.

The servers 502-1, 502-2, 502-3 analyze the trajectories and/or mobility patterns of each vehicle to predict what vehicles will meet at the intersections 528 and 530. The servers 502-1, 502-2, 502-3 anticipate that connected vehicles 504, 506, 508, 510, 512 meet each other at intersection 528 and connected vehicles 514, 516, 518, 520, 522, 524, 526 will meet at the other intersection 530.

The servers 502-1, 502-2, 502-3 then proceed to determine whether it is feasible to adjust application versions of the intersection management application in each connected vehicle 504, 506, 508, 510, 512 approaching the intersection 528 and each connected vehicles 514, 516, 518, 520, 522, 524, 526 approaching the intersection 530. Static parameters indicate that each version of the application has a medium file size and that vehicle hardware conditions are optimal (e.g., there is enough storage space). Dynamic parameters indicate that the connected vehicles 504, 510, 512, 514, 516, 518, 520, 522, 524, 526 are behaving predictably, the networks are performing ideally (e.g., not overly congested), and all connected vehicles 504, 506, 508, 510, 512, 514, 516, 518, 520, 522, 524, 526 have a strong connection with the servers 502. Because connected vehicles 506, 508 are driving unpredictably and aggressively, changing application versions guaranteed, though it is still feasible.

Because the servers 502-1, 502-2, 502-3 determined that it is feasible for connected vehicles 504, 506, 508, 510, 512, 514, 516, 518, 520, 522, 524, 526 to adjust their version of the stop management application, the servers 502-1, 502-2, 502-3 then determine the most feasible application management strategy. The servers 502-1, 502-2, 502-3 may determine that the most feasible application management strategy would be to have connected vehicles 520, and 526 downgrade to version 2 and have connected vehicle 524 upgrade to version 2 because there are more connected vehicles on version 2 approaching intersection 530 than there are connected vehicles having other versions.

The servers 502-1, 502-2, 502-3 may have less certainty about the feasibility for changing applications for the intersection 528 because the connected vehicles 506, 508 are driving unpredictably and aggressively. To accommodate for its lack of certainty about feasibility, server 502-1 may instruct the connected vehicles 506, 508 to replicate vehicle application versions to have both versions 2 and 3 in addition to already having version 1 installed. The connected vehicle 510 may be instructed to downgrade to version 2 to match the versions of connected vehicles 504 and 512 approaching intersection 528.

The servers 502-1, 502-2, 502-3 execute the most feasible application management strategy by first sending a downgrade command to a subset of connected vehicles. Here, the connected vehicles 510, 520, and 526 downgrade their versions of the application. The connected vehicles 510, 520, and 526 download version 2 from the servers 502-2, 502-3 and install it. Version 3 may stay on connected vehicles for use after they have passed the intersections 528 and 530. For example, the connected vehicles 526 have passed intersection 530 and may return to the version 3 because it is no longer approaching a 4-way non-signaled intersection.

The servers 502-1, 502-2, 502-3 then send an upgrade command to a subset of connected vehicles. Here, the connected vehicle 524 will upgrade. The connected vehicle 524 downloads version 2 from the server 502-3 and installs it. The previous version may stay on the connected vehicle 524 for use after it has passed intersection 530.

In some embodiments, the servers 502-1, 502-2, 502-3 may also send a replicate command to a subset of connected vehicles. Here, the server 502-1 has determined that connected vehicles 506 and 508 are so unpredictable because of their divergent mobility patterns and tailgating characteristics that the most feasible application management strategy would require the connected vehicles 506 and 508 to have each version of the application so that they may readily adjust applications. This way, the servers 502-1, 502-2, 502-3 can make more accurate predictions about where connected vehicles are going and what intersections they will encounter without having to factor in such unpredictable behavior as exhibited by the connected vehicles 506 and 508. In this instance, divergent mobility patterns and tailgating characteristics are predetermined driving patterns that servers 502-1, 502-2, 502-3 may monitor. Other characters may be included in the predetermined driving pattern as well. For example, erratic acceleration and deceleration.

After the connected vehicles 504, 506, 508, 510, 512, 514, 516, 518, 520, 522, 524, 526 have adjusted their application version, each connected vehicle should have a consensus on which application version to use for optimal compatibility at the intersections 528 and 530. The connected vehicles 504, 506, 508, 510, 512, 514, 516, 518, 520, 522, 524, 526 may now arrange for the most optimal 4-way stop management because the now matching application versions enable them to properly communicate with each other and prevent errors that may arise from mismatched versions of the 4-way stop management application.

It should be understood that the lane change assistance application and 4-way stop management application are exemplary and not intended to be limiting. For example, the application may be an adaptive cruise control application, a cooperative adaptive cruise control application, or any other application that may control the operations of the vehicle.

Furthermore, it should now be understood that embodiments described herein are directed to methods and systems of intelligent selection of application versions. Embodiments of the present disclosure prepare vehicles to have consistent versions of an application installed before the vehicles reach a time and/or place that requires use of the application. Particularly, embodiments include determining whether a plurality of vehicles are expected to be present within a predetermined distance of a vehicle incident, comparing versions of applications installed on the plurality of vehicles. In response to determining that the plurality of vehicles are expected to be present within the predetermined distance of the vehicle incident and that the versions of the applications among the plurality of vehicles are different, adjusting the applications installed in the one or more of the plurality of vehicles.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   determining whether a plurality of vehicles, each having an application installed, are expected to be present within a predetermined distance of a location of an event;
   comparing current versions of the application among the plurality of vehicles that are expected to be present within the predetermined distance of the location of the event; and
   in response to determining that the plurality of vehicles are expected to be present within the predetermined distance of the location and determining that the versions of the application among the plurality of vehicles are different, adjusting one or more versions of the application installed in one or more of the plurality of vehicles such that the plurality of vehicles have the same version of the application before the plurality of vehicles enter within the predetermined distance of the location of the event.

2. The method of claim 1, wherein adjusting the version of the application comprises:
   upgrading the application installed in one or more of the plurality of vehicles before the plurality of vehicles enter within a predetermined distance of the location of the event.

3. The method of claim 2, wherein upgrading the application installed in one or more of the plurality of vehicles comprises:
   downloading a higher version of the application from a cloud server, another vehicle, or a combination of the cloud server and the another vehicle.

4. The method of claim 1, wherein adjusting the version of the application comprises:
   downgrading the application installed in one or more of the plurality of vehicles before the plurality of vehicles enter within a predetermined distance of the location of the event.

5. The method of claim 4, wherein downgrading the application installed in one or more of the plurality of vehicles comprises:
   downloading a lower version of the application from a cloud server, another vehicle, or a combination of the cloud server and the another vehicle.

6. The method of claim 1, further comprising:
   determining whether a vehicle of the plurality of vehicles shows a predetermined driving pattern; and
   replicating the application in the vehicle to have a plurality of versions of the application in the vehicle in response to determining that the vehicle shows the predetermined driving pattern.

7. The method of claim 6, wherein the predetermined driving pattern includes one of a mobility pattern divergent from the plurality of vehicles and a set of tailgating characteristics.

8. The method of claim 1, further comprising:
   identifying the event;
   selecting, with a natural language processing model, the application based on the identified event and a description of the application.

9. The method of claim 1, further comprising:
   selecting, with a pattern analysis model, the application based on a usage history dataset of the application.

10. The method of claim 1, wherein the event is a vehicle incident, and the application is one of a lane change assistance application, an adaptive cruise control application, and a cooperative adaptive cruise control application.

11. The method of claim 1, wherein the event is an intersection crossing, and the application is a stop management application.

12. The method of claim 1, further comprising:
    reverting the version of the application in the one or more of the plurality of vehicles back to an original version prior to the adjusting after the one or more of the plurality of vehicles pass the location of the event.

13. A system comprising one or more hardware processors operable to:
    determine whether a plurality of vehicles, each having an application installed, are expected to be present within a predetermined distance of a location of an event;
    compare current versions of the application among the plurality of vehicles that are expected to be present within the predetermined distance of the location of the event; and
    in response to determining that the plurality of vehicles are expected to be present within the predetermined distance of the location and determining that the versions of the application among the plurality of vehicles are different, adjust one or more versions of the application installed in one or more of the plurality of vehicles such that the plurality of vehicles have the same version of the application before the plurality of vehicles enter within the predetermined distance of the location of the event.

14. The system of claim 13, wherein adjusting the version of the application comprises:
    upgrading the application installed in one or more of the plurality of vehicles before the plurality of vehicles enter within a predetermined distance of the location of the event.

15. The system of claim 13, wherein adjusting the version of the application comprises:
    downgrading the application installed in one or more of the plurality of vehicles before the plurality of vehicles enter within a predetermined distance of the location of the event.

16. The system of claim 13, wherein the one or more processors is further operable to:
    determine whether a vehicle of the plurality of vehicles shows a predetermined driving pattern; and
    replicate the application in the vehicle to have a plurality of versions of the application in the vehicle in response to determining that the vehicle shows the predetermined driving pattern.

17. A non-transitory computer readable medium comprising machine-readable instructions that cause a processor to perform at least the following when executed:
    determine whether a plurality of vehicles, each having an application installed, are expected to be present within a predetermined distance of a location of an event;
    compare current versions of the application among the plurality of vehicles that are expected to be present within the predetermined distance of the location of the event; and
    in response to determining that the plurality of vehicles are expected to be present within the predetermined distance of the location and determining that the versions of the application among the plurality of vehicles are different, adjust one or more versions of the application installed in one or more of the plurality of vehicles such that the plurality of vehicles have the same version of the application before the plurality of vehicles enter within the predetermined distance of the location of the event.

18. The non-transitory computer readable medium of claim 17, wherein adjusting the version of the application comprises:
upgrading the application installed in one or more of the plurality of vehicles before the plurality of vehicles enter within a predetermined distance of the location of the event.

19. The non-transitory computer readable medium of claim 17, wherein adjusting the version of the application comprises:
downgrading the application installed in one or more of the plurality of vehicles before the plurality of vehicles enter within a predetermined distance of the location of the event.

20. The non-transitory computer readable medium of claim 17, wherein the machine-readable instructions further cause the processor to:
determine whether a vehicle of the plurality of vehicles shows a predetermined driving pattern; and
replicate the application in the vehicle to have a plurality of versions of the application in the vehicle in response to determining that the vehicle shows the predetermined driving pattern.

* * * * *